US012786217B2

(12) United States Patent
Tongaonkar et al.

(10) Patent No.: US 12,786,217 B2
(45) Date of Patent: Nov. 3, 2026

(54) SECURITY ALERT PRIORITIZATION FOR CLOUD-BASED RESOURCES

(71) Applicant: PALO ALTO NETWORKS, INC., Santa Clara, CA (US)

(72) Inventors: Alok Tongaonkar, San Jose, CA (US); Venkatesh Pappakrishnan, Dublin, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 63 days.

(21) Appl. No.: 18/499,256

(22) Filed: Nov. 1, 2023

(65) Prior Publication Data

US 2025/0141898 A1 May 1, 2025

(51) Int. Cl.
*H04L 9/40* (2022.01)

(52) U.S. Cl.
CPC ...... *H04L 63/1425* (2013.01); *H04L 63/1416* (2013.01); *H04L 63/20* (2013.01)

(58) Field of Classification Search
CPC . H04L 63/1425; H04L 63/1416; H04L 63/20; H04L 63/1433
See application file for complete search history.

(56) References Cited

U.S. PATENT DOCUMENTS 6,347,374 B1 2/2002 Drake et al.
9,686,299 B2 * 6/2017 Stevenson ........... H04L 63/1433
10,587,642 B1 3/2020 Herman-Saffar et al.
10,728,262 B1 7/2020 Vaswani et al.
10,873,596 B1 12/2020 Bourget et al.
10,893,068 B1 1/2021 Khalid et al.
10,904,277 B1 1/2021 Mehr
11,140,194 B2 * 10/2021 Hecht ..................... H04L 63/20
11,178,168 B1 11/2021 Lin et al.
11,303,666 B1 * 4/2022 Peters ................. H04L 63/1441
(Continued)

FOREIGN PATENT DOCUMENTS

CN 1612532 5/2005
CN 101536455 9/2009
(Continued)

OTHER PUBLICATIONS

Mcafee Enterprise, "Alert Fatigue: 31.9% of IT Security Professionals Ignore Alerts," Blog, pp. 1-3, Jan. 19, 2017, as downloaded from https://web.archive.org/web/20221013225446/https://www.mcafee.com/blogs/enterprise/cloud-security/alert-fatigue-31-9-of-it-security-professionals-ignore-alerts/.
(Continued)

*Primary Examiner* — Hadi S Armouche
(74) *Attorney, Agent, or Firm* — Meitar Patents LTD.

(57) ABSTRACT

Methods, storage systems and computer program products implement embodiments of the present invention for protecting a cloud computing system. In these embodiments, security alerts pertaining to cloud-based resources of the system are received, and a plurality of attack paths traversing the cloud-based resources are identified. Respective impact scores for the cloud-based resources can then be computed based on respective counts of the identified attack paths traversing each of the cloud-based resources. Finally, the security alerts can be prioritized responsively to the respective impact scores of the cloud-based resources to which the security alerts pertain.

14 Claims, 5 Drawing Sheets

(56) References Cited

U.S. PATENT DOCUMENTS

| | | | | |
|---|---|---|---|---|
| 11,637,861 | B2 * | 4/2023 | Burle | H04L 67/1097 726/25 |
| 11,956,253 | B1 | 4/2024 | Lin et al. | |
| 12,045,610 | B1 | 7/2024 | Myers et al. | |
| 12,380,389 | B2 | 8/2025 | Schmidt et al. | |
| 2004/0199793 | A1 | 10/2004 | Wilken et al. | |
| 2005/0018618 | A1 | 1/2005 | Mualem et al. | |
| 2005/0249214 | A1 | 11/2005 | Peng | |
| 2007/0073519 | A1 | 3/2007 | Long | |
| 2010/0319069 | A1 | 12/2010 | Granstedt et al. | |
| 2014/0215619 | A1 | 7/2014 | Lee | |
| 2015/0324188 | A1 | 11/2015 | Raje et al. | |
| 2015/0356451 | A1 | 12/2015 | Gupta et al. | |
| 2016/0366167 | A1 | 12/2016 | Yumer | |
| 2017/0063912 | A1 | 3/2017 | Muddu et al. | |
| 2017/0171231 | A1 | 6/2017 | Reybok et al. | |
| 2018/0121650 | A1 | 5/2018 | Brown | |
| 2018/0365416 | A1 | 12/2018 | Monastyrsky et al. | |
| 2019/0034641 | A1 | 1/2019 | Gil et al. | |
| 2019/0098025 | A1 | 3/2019 | Lim | |
| 2020/0033144 | A1 | 1/2020 | Du et al. | |
| 2020/0274880 | A1 | 8/2020 | Badawy et al. | |
| 2020/0311260 | A1 | 10/2020 | Klonowski et al. | |
| 2020/0314117 | A1 | 10/2020 | Nguyen et al. | |
| 2021/0084063 | A1 | 3/2021 | Triantafillos et al. | |
| 2021/0182387 | A1 | 6/2021 | Zhu et al. | |
| 2021/0266339 | A1 | 8/2021 | Moshitzky et al. | |
| 2021/0273958 | A1 | 9/2021 | McLean | |
| 2021/0304204 | A1 | 9/2021 | Ramesh et al. | |
| 2021/0400070 | A1 | 12/2021 | Ackerman et al. | |
| 2022/0086178 | A1 | 3/2022 | Jayamohan et al. | |
| 2022/0263828 | A1 | 8/2022 | Brandel et al. | |
| 2023/0007023 | A1 | 1/2023 | Andrabi et al. | |
| 2023/0075355 | A1 | 3/2023 | Twigg et al. | |
| 2023/0129144 | A1 | 4/2023 | Neil et al. | |
| 2023/0164039 | A1 | 5/2023 | Vadlamani | |
| 2023/0164162 | A1 | 5/2023 | Lee et al. | |
| 2023/0229771 | A1 | 7/2023 | Sameer et al. | |
| 2024/0069948 | A1 | 2/2024 | Thomas et al. | |
| 2024/0126910 | A1 | 4/2024 | Johnson et al. | |
| 2024/0338489 | A1 | 10/2024 | Zhu et al. | |
| 2024/0340306 | A1 | 10/2024 | Staab et al. | |
| 2024/0356936 | A1 * | 10/2024 | Hlavac | H04L 63/20 |
| 2024/0380766 | A1 | 11/2024 | Shachar et al. | |
| 2024/0386015 | A1 | 11/2024 | Crabtree et al. | |
| 2024/0414178 | A1 | 12/2024 | Neuvirth-Telem et al. | |
| 2025/0007882 | A1 | 1/2025 | Akhtar et al. | |
| 2025/0094585 | A1 | 3/2025 | Wuest et al. | |
| 2025/0173431 | A1 | 5/2025 | Divakaran et al. | |
| 2025/0181718 | A1 | 6/2025 | Saqib et al. | |
| 2025/0217479 | A1 | 7/2025 | Palanki | |
| 2025/0247402 | A1 | 7/2025 | Singla | |
| 2025/0260712 | A1 | 8/2025 | Hong et al. | |
| 2026/0003963 | A1 | 1/2026 | Olszak et al. | |

FOREIGN PATENT DOCUMENTS

| | | | |
|---|---|---|---|
| CN | 106131050 | | 11/2016 |
| CN | 114640507 | A | 6/2022 |
| CN | 109104395 | | 8/2022 |
| CN | 115396324 | | 11/2022 |
| CN | 116074031 | A | 5/2023 |
| GB | 0401420 | | 2/2004 |
| JP | 2009111448 | A | 5/2009 |
| JP | 2021-523451 | A | 9/2021 |
| WO | 2015149062 | A1 | 10/2015 |

OTHER PUBLICATIONS

Sumo Logic, "2020 State of SecOps and Automation," pp. 1-15, Jun. 2020.

Cobb, "How to Address and Prevent Security Alert Fatigue," TechTarget, pp. 1-3, Feb. 10, 2021, as downloaded from https://www.techtarget.com/searchsecurity/tip/Why-security-alert-fatigue-matters-and-how-to-address-it.

Segal, "Alert Fatigue' Can Lead to Missed Cyber Threats and Staff Retention/Recruitment Issues: Study," Forbes Newsletter, pp. 1-4, Nov. 8, 2021, as downloaded from https://www.forbes.com/sites/edwardsegal/2021/11/08/alert-fatigue-can-lead-to-missed-cyber-threats-and-staff-retentionrecruitment-issues-study/?sh=3f1f127835c9.

Ninawe, "What are Terraform Templates? Examples and Use Cases," SpaceLift, Inc., pp. 1-14, Mar. 3, 2022, as downloaded from https://web.archive.org/web/20230930185347/https://spacelift.io/blog/terraform-templates.

Rackblogger, "How to Prioritize Threats and Reduce Alert Fatigue," RackSpace Technology, pp. 1-2, Oct. 8, 2019, as downloaded from https://www.rackspace.com/blog/how-to-prioritize-threats-and-reduce-alert-fatigue.

IDG Communications, Inc., "A Business-Driven Approach to Prioritizing Security Alerts," CSO Online Newsletter, pp. 1-3, Jul. 24, 2017, as downloaded from https://www.csoonline.com/article/3209739/a-business-driven-approach-to-prioritizing-security-alerts.html.

Amazon Web Services, Inc., "Overview of Amazon Web Services", AWS Whitepaper, pp. 1-85, Aug. 5, 2021.

Amazon Web Services, Inc., "Amazon S3 Features", pp. 1-8, year 2023 as downloaded from https://web.archive.org/web/20230525230629/https://aws.amazon.com/s3/features/.

Palo Alto Networks, "Cortex XDR", datasheet, pp. 1-9, year 2023.

Wikipedia, "Google Cloud Platform," pp. 1-15, last update Aug. 13, 2023.

Palo Alto Networks, "Prisma Cloud", datasheet, pp. 1-2, year 2023.

Amazon Web Services, Inc., "Amazon Elastic Compute Cloud", pp. 1-13, API Version, Jun. 15, 2014.

Amazon Web Services, Inc., "Overview of Amazon RDS Open Source Relational Databases Services and Key Features", pp. 1-36, year 2022.

Amazon Web Services, Inc., "AWS Prescriptive Guidance", pp. 1-200, year 2024.

Amazon Web Services, Inc., "Serverless," pp. 1-113, year 2024.

Amazon Web Services, Inc., "AWS CloudFormation Templates", pp. 1-4, year 2023.

Notice of References Cited, U.S. Appl. No. 18/361,850, dated Dec. 30, 2025.

Non-Final Office Action, U.S. Appl. No. 18/361,850, filed Dec. 30, 2025.

Final Office Action, U.S. Appl. No. 18/357,121, filed Oct. 23, 2025.

Final Office Action for U.S. Appl. No. 18/357,121, dated Oct. 23, 2025.

Notice of References Cited for U.S. Appl. No. 18/357,121, dated Oct. 23, 2025.

Non-Final Office Action for U.S. Appl. No. 18/661,626, dated Oct. 1, 2025.

Notice of References Cited for U.S. Appl. No. 18/661,626, dated Oct. 1, 2025.

Non-Final Office Action for U.S. Appl. No. 18/783,523, dated Oct. 21, 2025.

Notice of References Cited for U.S. Appl. No. 18/783,523, dated Oct. 21, 2025.

Non-Final Office Action for U.S. Appl. No. 18/731,420, dated Oct. 2, 2025.

Notice of References Cited for U.S. Appl. No. 18/731,420, dated Oct. 2, 2025.

Final Office Action for U.S. Appl. No. 18/361,850, dated Sep. 30, 2025.

Notice of References Cited for U.S. Appl. No. 18/361,850, dated Sep. 30, 2025.

Decision on Appeal (Appeal 2024-003437) for U.S. Appl. No. 17/700,579, dated Jul. 30, 2025.

First Office Action, Chinese Application No. 202310649492.6, dated Jul. 24, 2025.

Non-Final Office Action for U.S. Appl. No. 18/322,231, dated Sep. 30, 2025.

Notice of References Cited for U.S. Appl. No. 18/322,231, dated Sep. 30, 2025.

(56) References Cited

OTHER PUBLICATIONS

Australian Application No. 2022441431, Examination report No. 1 dated Jul. 3, 2025.
Second Office Action, Chinese Application No. 202310649426.9, dated Sep. 16, 2025.
Search Report, Chinese Application No. 202310649492.6, dated Jul. 21, 2025.

* cited by examiner

SECURITY ALERT PRIORITIZATION FOR CLOUD-BASED RESOURCES

FIELD OF THE INVENTION

The present invention relates generally to computer security, and particularly to a dynamic resource risk scoring algorithm for resources and resource groups in public cloud environments.

BACKGROUND OF THE INVENTION

Cloud configuration settings refer to the specific parameters and options that govern the behavior and functionality of cloud-based resources. These settings are crucial for optimizing performance, security, scalability, and cost-effectiveness in cloud computing environments. A misconfigured cloud resource can be exploited by attackers in several ways, potentially leading to data breaches, service disruptions, or other security incidents. Therefore, effective cloud configuration settings are essential for aligning cloud resources with organizational goals, optimizing resource utilization, and ensuring the security and compliance of cloud-based systems and applications.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a cloud computing system, the method including receiving security alerts pertaining to cloud-based resources of the system, identifying a plurality of attack paths traversing the cloud-based resources, computing respective impact scores for the cloud-based resources based on respective counts of the identified attack paths traversing each of the cloud-based resources, and prioritizing the security alerts responsively to the respective impact scores of the cloud-based resources to which the security alerts pertain.

In one embodiment, the security alerts have respective severity levels, and the method further includes computing a resource severity score for each given cloud-based resource based on is respective impact score and the severity levels of the security alerts pertaining to the given cloud-based resource, and prioritizing the security alerts responsively to the respective resource severity scores of the cloud-based resources to which the security alerts pertain.

In another embodiment, the severity levels range from low severity to high severity, and wherein computing the resource severity scores includes applying exponential scaling factors to the severity levels so as to prioritize the security alerts having high severity.

In an additional embodiment, the security alerts have respective times, and wherein computing the resource severity score for each given cloud-based resource is based on the respective times of the security alerts pertaining to the given cloud-based resource.

In a further embodiment, the respective times includes first times, wherein the resource severity scores are computed at respective second times subsequent to the first times, and the method further includes computing, for each given security alert pertaining to one of the cloud-based resources, a respective time decay factor based on a difference between its respective first time and the second time for the resource severity score for the one of the cloud-based resources, and computing the resource severity score for each given cloud-based resource based on the respective time decay factors of the security alerts pertaining to the given cloud-based resource.

In a supplemental embodiment, the method further includes grouping the cloud-based resources based on a grouping parameter, assigning risk levels to the resource severity score based on specified score ranges for the grouping parameter, and wherein prioritizing the security alerts responsively to the respective resource severity scores of the cloud-based resources to which the security alerts pertain includes prioritizing the security alerts responsively to the respective risk levels for the resource severity scores of the cloud-based resources to which the security alerts pertain.

In one embodiment, a given grouping parameter includes all the cloud-based resources.

In another embodiment, the received security alerts were conveyed by one of more software applications executing in the cloud computing system, and wherein a given grouping parameter includes a given software application.

In an additional embodiment, the cloud-based resources have respective resource types, and wherein a given grouping parameter includes a given resource type.

In a further embodiment, the cloud-based resources have respective resource groupings, and wherein a given grouping parameter includes a given resource group.

In a supplemental embodiment, the cloud-based resources have respective build types, and wherein a given grouping parameter includes a given build type.

In some embodiments, a given attack path includes an ordered sequence of a subset of the cloud-based resources that exposes a service provided by the cloud computing system.

In other embodiments, the cloud-based resources include respective configuration settings, and wherein a given security alert pertaining to a given cloud-based resource indicates the configuration settings for the given cloud-based resource do not comply with a specified configuration policy.

There is also provided, in accordance with an embodiment of the present invention, an apparatus for protecting a cloud computing system, including a memory, and a processor configured to receive and store to the memory security alerts pertaining to cloud-based resources of the system, to identify a plurality of attack paths traversing the cloud-based resources, to compute respective impact scores for the cloud-based resources based on respective counts of the identified attack paths traversing each of the cloud-based resources, and to prioritize the security alerts responsively to the respective impact scores of the cloud-based resources to which the security alerts pertain.

There is additionally provided, in accordance with an embodiment of the present invention, a computer software product for protecting a cloud computing system, the computer software product including a non-transitory computer-readable medium, in which program instructions are stored, which instructions, when read by a computer, cause the computer to receive security alerts pertaining to cloud-based resources of the system, to identify a plurality of attack paths traversing the cloud-based resources, to compute respective impact scores for the cloud-based resources based on respective counts of the identified attack paths traversing each of the cloud-based resources, and to prioritize the security alerts responsively to the respective impact scores of the cloud-based resources to which the security alerts pertain.

BRIEF DESCRIPTION OF THE DRAWINGS

The disclosure is herein described, by way of example only, with reference to the accompanying drawings, wherein.

DETAILED DESCRIPTION OF EMBODIMENTS

Cloud computer systems typically deploy large numbers of cloud-based resources. Typically, many of these cloud-based resources in public cloud accounts violate multiple policies meant to secure an enterprise. This can result in a large number of security alerts being generated for the policy violations. Since the violations are typically resolved by correcting the configuration of the cloud-based resources to which the security alerts pertain, large numbers of security alerts can make it difficult for a Security Operations Center (SOC) analyst to identify which of the security alerts to prioritize for resolution.

Embodiments of the present invention provide methods and systems for protecting a cloud computing system comprising multiple cloud-based resources. As described hereinbelow, upon receiving security alerts pertaining to the cloud-based resources and identifying a plurality of attack paths traversing the cloud-based resources, respective impact scores can be computed for the cloud-based resources based on respective counts of the identified attack paths traversing each of the cloud-based resources. The security alerts can then be prioritized responsively to the respective impact scores of the cloud-based resources to which the security alerts pertain.

Depending on the of number security violations, reconfiguring a given cloud-based resource so as to comply with all relevant configuration policies can be a time intensive operation. By prioritizing the security alerts based on their respective impact scores, systems implementing embodiments of the present invention can provide more useful distribution of the security alerts (i.e., based on their respective impact scores) that can help a Security Operations Center (SOC) analyst to identify security violations for a given cloud-based resource that, when rectified, can break multiple attack paths.

In additional embodiments, as described hereinbelow, the impact score for a given cloud-based resource can be augmented with features of the security alerts pertaining to the given cloud-based resource. Examples of these features include respective severity levels and respective times of the security alerts.

System Description

Figure 1:
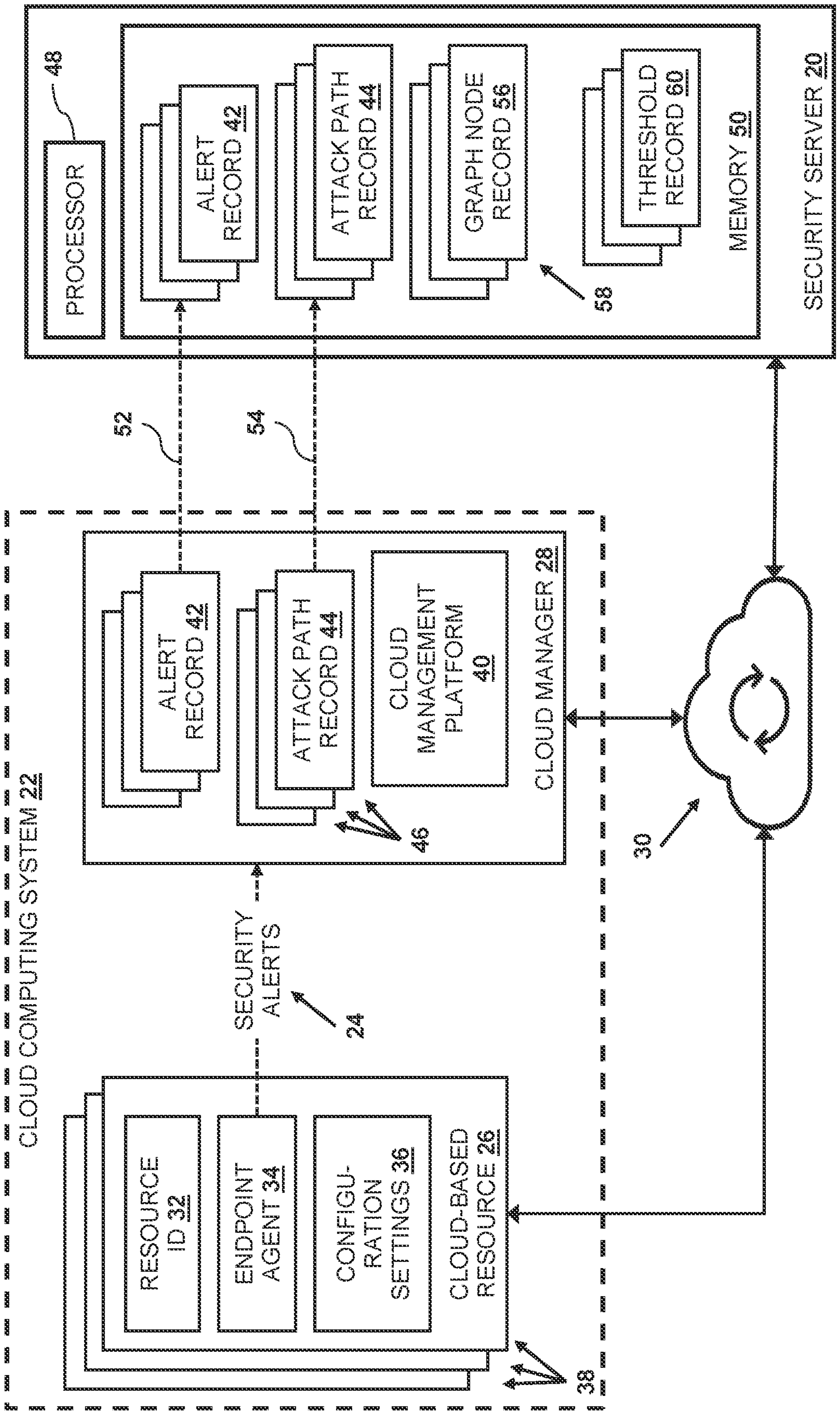
FIG. 1 is a block diagram showing an example of a security server that is configured to prioritize cloud-based resource security alerts received from a cloud manager, in accordance with an embodiment of the present invention.

FIG. 1 is a block diagrams that shows an example of a security server 20 that can protect a cloud computing system 22 by prioritizing security alerts 24 for multiple cloud-based resources 26 deployed in the cloud computing system, in accordance with an embodiment of the present invention.

In the configuration shown in FIG. 1, cloud computing system 22 comprises cloud-based resources 26 and a cloud manager 28, which can all be deployed by a cloud service provider such as AMAZON WEB SERVICES™ (AWS™), provided by AMAZON. COM, INC., 410 Terry Avenue North, Seattle, WA, USA. In some embodiments, security server 20, cloud-based resources 26 and cloud manager 28 are all coupled to (and therefore can communicate over) a public network such as Internet 30.

Each cloud-based resource 26 may comprise a unique resource identifier (ID) 32, an endpoint agent 34, and configuration settings 36, and. For a given cloud-based resource 26, configuration settings 36 comprise hardware and software settings that govern the behavior and functionality of cloud-based resources. For example, a given cloud-based resource 26 may comprise an AWS™ SIMPLE STORAGE SERVICE™ (S3™) bucket, and the configuration settings for the S3™ bucket may comprise information such as a bucket region, bucket permissions, etc.

Endpoint agents 34 (also known as endpoint security agents or security agents) comprises software applications that execute (typically in the background) on cloud-based resource 26 so as to identify any vulnerabilities in real-time. One example of a given endpoint security agent 34 is CORTEX XDR™ produced by PALO ALTO NETWORKS INC., 3000 Tannery Way, Santa Clara, CA 95054 USA).

In some embodiments, in response to detecting any policy violations in configuration settings 36 (i.e., any of the configuration settings that do not comply with a specified configuration policy), endpoint agents 34 can convey security alerts 24 to cloud manager 28. In other embodiments, endpoint agents 34 can convey security alerts 24 to security server 20.

For example, a given cloud-based resource 26 may comprise a GOOGLE CLOUD PLATFORM™ (GCP™) storage bucket, provided by ALPHABET INC., 1600 Amphitheatre Parkway, Mountain View, CA, USA. In this example:

- Configuration setting 36 can specify that the GCP™ storage bucket has public access to all authenticated users so as to ensure that the storage bucket is not anonymously or publicly accessible.
- A given security alert 24 for the given cloud-based resource 26 can indicate that the storage bucket has public access enabled for all the authenticated users.

Some cloud-based resources 26 may be configured to provide respective cloud services 38 to other cloud-based resources 26 or other computing devices (not shown) coupled to Internet 30. Examples of cloud services 38 include, but are not limited to, storage, processing power, database management and networking.

Cloud manager 28 comprises a cloud management platform 40 (i.e., a cloud-based application running on cloud manager 28) that is configured to safeguard cloud-native applications, data, and workloads across multi-cloud environments by providing services such as real-time threat detection and response, compliance monitoring, and data protection. An example of a given cloud management platform 40 that can provide these is PRISMA™ CLOUD, produced by PALO ALTO NETWORKS INC.

In the configuration shown in FIG. 1, cloud manager 28 also comprises a set of alert records 42 and a set of attack path records 44 that can be managed by cloud management platform 40. In some embodiments, alert records 42 correspond to security alerts 24. In these embodiments, upon cloud manager 28 receiving a given security alert 24, cloud management platform 40 can add a new alert record 42 and populate the new alert record with details of the given security alert. Alert records 42 are described in the description referencing FIG. 2 hereinbelow.

In additional embodiments, cloud management platform 40 can analyze alert records 42 and cloud-based resources 26 so as to identify one or more attack paths 46. In embodiments herein, a given attack path 46 comprises an ordered sequence of cloud-based resources 26 (i.e., a "path") that a malicious actor can traverse so as to exploit a vulnerability or weakness in cloud computing system 22, thereby gaining unauthorized access to (for example) a given service 38 so as to access data or computing resources in cloud computing system 22. In the configuration shown in FIG. 1, cloud management platform 40 can store attack paths 46 to corresponding attack path records 44 that are described in the description referencing FIG. 3 hereinbelow.

Security server 20 may comprise a processor 48 and a memory 50 that can store copies of alert records 42 and attack path records 44 that the security server can retrieve from cloud manager 28, as indicated by arrows 52 and 54. Memory 50 can also store a set of graph node records 56 that processor 48 can generate from attack path records 44 using embodiments described hereinbelow. In some embodiments, processor 48 can generate a directed graph 58 from graph nodes 56, and store the generated directed graph to memory 50. Graph node records 56 and directed graph 58 are respectively described in the descriptions referencing FIGS. 4 and 6 hereinbelow.

Memory 50 can additionally store a set of threshold records 60 that are described in the description referencing FIG. 5 hereinbelow.

Processor 48 comprises one or more general-purpose central processing units (CPU) or special-purpose embedded processors, which are programmed in software or firmware to carry out the functions described herein. This software may be downloaded to security server 20 in electronic form, over a network, for example. Additionally or alternatively, the software may be stored on tangible, non-transitory computer-readable media, such as optical, magnetic, or electronic memory media. Further additionally or alternatively, at least some of the functions of processor 38 may be carried out by hard-wired or programmable digital logic circuits.

Examples of memory 50 include dynamic random-access memories, non-volatile random-access memories, hard disk drives and solid-state disk drives.

In some embodiments, tasks described herein performed by processor 48 may be split among multiple physical and/or virtual computing devices. In other embodiments, these tasks may be performed in a managed cloud service such as cloud computing system 22.

Figure 2:
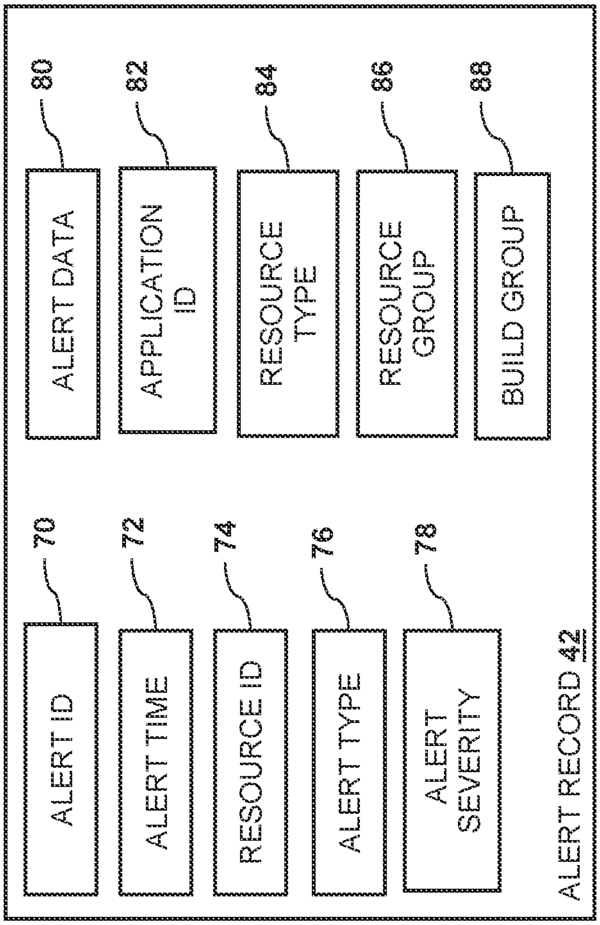
FIG. 2 is a block diagram showing an example of an alert record generated by the cloud manager, in accordance with an embodiment of the present invention.

FIG. 2 is a block diagram showing an example of a given alert record 42, in accordance with an embodiment of the present invention. As described supra, alert records 42 typically correspond to security alerts 24 for cloud-based resources 26. Each alert record 42 can store information (i.e., features) such as:

- A unique alert ID 70 for the corresponding security alert for a given cloud-based resource 26.
- An alert time 72 indicating a date and time when the corresponding security alert was generated.
- A resource ID 74 comprising resource ID 32 for a given cloud-based resource 26 to which the corresponding security alert pertains. In embodiments herein, security alerts typically indicate a given configuration setting 36 a given cloud-based resource 26 that does not comply with a specified policy.
- An alert type 76 indicating a given policy violation. In a first example, alert type 76 can indicate that an AWS™ S3™ BUCKET (i.e., the given cloud-based resource) is open to Internet 30. In a second example, alert type 76 can indicate that the given cloud-based resource comprises an AWS™ ELASTIC COMPUTE CLOUD™ (EC2™) instance with PASSROLE permissions (i.e, since PASSROLE permission is necessary for passing a high-privilege role to the new/existing EC2™ instance) . . . . An alert severity 78 indicating a severity of the corresponding security alert. For example, severity 78 can be a value between one (low severity) and five (high severity).
- Alert data 80 that can store any metadata such as configuration settings for the given cloud-based resource that violate one or more policies.
- An application ID 82 indicating an application from which security server 20 received the corresponding security alert. In the example shown in FIG. 1, security server 20 received the corresponding security alert by receiving, from cloud manager 27, the alert record for the corresponding security alert. In another embodiment, security server 20 can receive the corresponding alert from another software application executing in cloud computing system 22 such as a given endpoint agent 34 executing on a given cloud-based resource 26. In this embodiment:
  - If all the endpoint agents are the same (i.e., different instances of a single software application), then all the application IDs for the security alerts can reference the same single software application.
  - If there are different endpoint agents 34 (e.g., from different vendors) executing in n cloud computing system 22, the application IDs can reference the different endpoint agents.
  - In a first alert embodiment, endpoint agent 34 can generate a new alert record 42 for the corresponding security alert, and security server 20 can receive the corresponding security alert by receiving the new alert record.
  - In a second alert embodiment, endpoint agent 34 can convey the corresponding security alert to security server 20, and the security server can add and populate a new alert record 42 for the corresponding security alert.
- A resource type 84 referencing a type (i.e., a category) for the given cloud-based resource. In one embodiment, resource types 84 can reference broad categories such as computing, storage and database services. In another embodiment, resource types 84 can reference narrower categories. In this embodiment, examples of resource types 84 in an AWS™ environment can include EC2™, RELATIONAL DATABASE SERVICE (RDS), SECURITY GROUP and SERVERLESS COMPUTING.

A resource group 86 that can reference a specified grouping of cloud-based resources 26. Examples of resource groups 86 include a specific software application, a specific team of individuals, a specific business unit or a specific organization.

A build group 88 (also referred to herein as a build type) indicating how the given cloud-based resource was built and deployed in cloud computing system 22. Examples of build group 88 include AWS™ CLOUDFORMATION TEMPLATE™ (CFT™), TERRAFORM TEMPLATE™ (TFT™), host image, container image and serverless image.

As described supra, alert records 42 correspond to security alerts 24. In embodiments herein, a given feature in given alert record 42 may also be referred to as a given feature in the corresponding security alert. For example, alert severity 78 for a given security alert 24 refers to the alert severity in the corresponding alert record.

Figure 3:
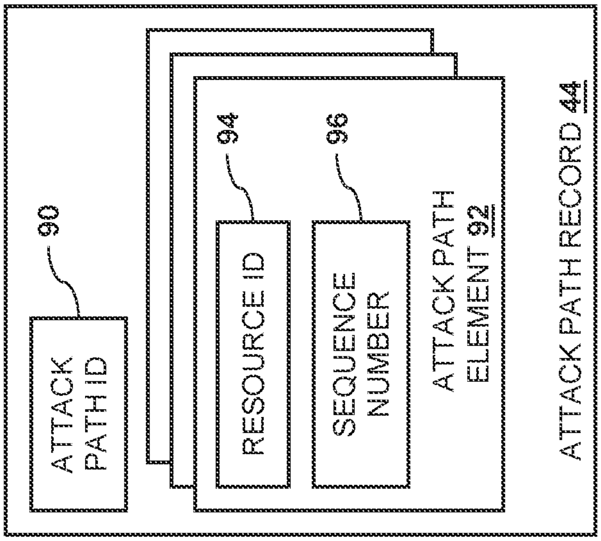
FIG. 3 is a block diagram showing an example of an attack path record generated by the cloud manager, in accordance with an embodiment of the present invention.

FIG. 3 is a block diagram showing an example of an attack path record generated by the cloud manager, in accordance with an embodiment of the present invention. As described supra, each attack path 46 comprises a sequence of cloud-based resources 26 that a malicious actor can traverse so as to exploit a vulnerability or weakness in cloud computing system 22.

Each attack path record 44 corresponds to a given attack path 46, and can store information such as:

A unique attack path ID 90 for the corresponding attack path.

A set of attack path elements 92, each of the attack path elements comprising:

A resource ID 94 comprising a given resource ID 32 for a given cloud-based resource 26 in the given attack path.

Figure 4:
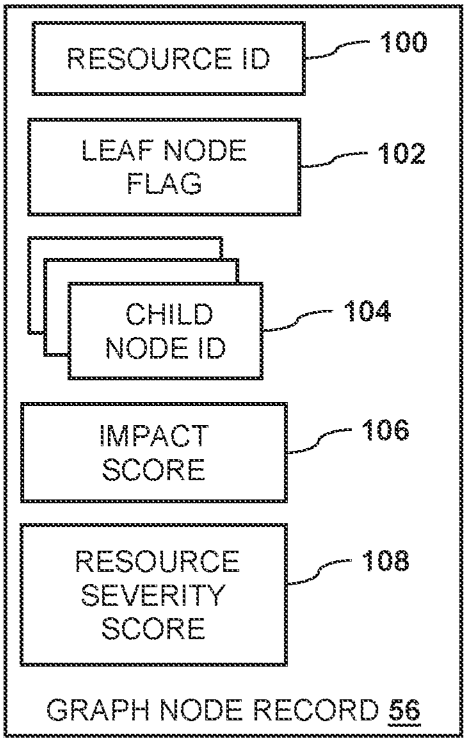
FIG. 4 is a block diagram showing an example of a graph node record generated by the cloud manager, in accordance with an embodiment of the present invention.

A sequence number 96 indicating a position of the given cloud-based resource in the sequence. For example, if the given attack path comprises three cloud-based resources 26, the sequence number for the first cloud-based resource in the given attack path is "1", the sequence number for the second cloud-based resource in the given attack path is "2", and the sequence number for the third cloud-based resource in the given attack path is "3", FIG. 4 is a block diagram showing an example of a given graph node record 56, in accordance with an embodiment of the present invention. In embodiments described herein, processor 48 can generate directed graph 58 based on attack paths 46. As described in the description referencing FIG. 6 hereinbelow, directed graph 58 comprises a set of nodes (also known as vertices or points) that correspond to graph node records 56. In some embodiments, processor 48 can populate graph node records 56 with information from attack paths 46, and the processor can generate directed graph 58 based on the information in the graph node records.

In some embodiments, graph node records 56 correspond to respective cloud-based resource 26, and each graph node record 56 can store information such as:

A resource ID 100 comprising resource ID 32 in the corresponding cloud-based resource.

A leaf node flag 102 indicating whether or not the corresponding cloud-based resource corresponds to a leaf node in directed graph 58.

One or more child node IDs 104. If the corresponding cloud-based resource is not a leaf node in graph 58, then the node corresponding to the corresponding cloud-based resource comprises one or more child nodes, each of the child nodes corresponding to an additional cloud-based resource 26. Each given child ID 104 comprises resource 32 for the corresponding cloud-based resource.

An impact score 106 comprising a count of attack paths 46 that include the corresponding cloud-based resource. Examples of impact score 106 are described hereinbelow.

A resource severity score (RSS) 108. In embodiments herein, processor 48 can compute resource severity score 108 based on impact score 106, and alert times 72 and alert severities 78 for the alerts that pertain to the corresponding cloud-based resource. In some embodiments, processor 48 can compute RSS 108 for the corresponding cloud-based resource using the following equation:

$$RSS = \text{Impact\_score} * \sum n^{level} * t_{decay}$$

where Impact_score references impact score 106, n indicates a given security alert 24 that pertains to the corresponding cloud-based resource, level comprises alert severity 78 for the given alert, and $t_{decay}$ Comprises a time decay (TD) value based on a difference between alert time 72 for the given alert and when (i.e., the date and time) processor 48 computes RSS 108.

In some embodiments, $n^{level}$ provides an exponential scaling factor so that security alerts 24 with higher severities 78 has a greater impact on RSS 108 than security alerts 24 with lower severities 78 (i.e., even if there are more security alerts 24 with lower alert severities 78 than security alerts 24 with higher severities 78). In other words, the exponential scaling of alert severities 78 helps limit any cloud-based resources 26 with security alerts 24 from moving to a higher risk level (risk levels are described in the description referencing FIG. 5 hereinbelow).

In one embodiment, processor 48 can use the following formula to compute time decay for a given security alert 24:

$$\alpha(t) = \frac{1}{1 + e^{r(t-t_0)}}$$

where r is a decay rate, $r*t_0$ is a constant, and to is a half-life period. In this embodiment, the scaling stays close to 1 for first n days and drops significantly reaching half-value at to and close to 0 for values $\geq 2*t_0$.

In some embodiments, processor 48 can maintain approximately the same value for the TD component for the first few days and then reduce the values significantly with increase in n. For example, a policy failure that occurred yesterday (n−1) and the other one that occurred 2 days ago will have approximately the same value with $\alpha(t)\sim 1$. However, the delta increases with increase in n with $\alpha(t)\sim 0$ for large value of n.

Figure 5:
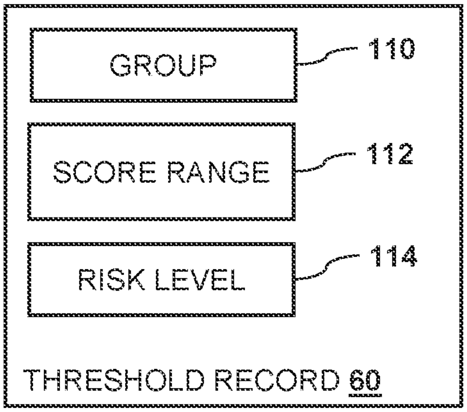
FIG. 5 is a block diagram showing an example of a threshold record managed by the security server, in accordance with an embodiment of the present invention.

FIG. 5 is a block diagram showing an example of a given threshold record 60, in accordance with an embodiment of the present invention. In the configuration shown in FIG. 5, the given threshold record can store information such as:

A group 110 (also referred to herein as a grouping parameter) that references all cloud-based resources 26, a given application ID 82, a given resource type 84, a given resource group 86 a given build group 84 (or a combination of two or more of these features).

A score range 112 for RSS 108.

A risk level 114 such as low, medium, high and critical.

In embodiments herein processor 48 can use RSS 108 and the information in threshold records 60 so compute the risk level for a given cloud-based resource 26. In a first example, group 110 in a first subset of threshold records 60 may reference all cloud-based resources 26, and processor 48 can use the score ranges in the first subset so as to compute the risk level for the given cloud-based resource. In a second example, group 110 in a second subset of threshold records 60 may reference a subset cloud-based resources 26 (e.g., group 110 may reference the cloud-based resources that are EC2™ instances), and processor 48 can use the score ranges in the second subset so as to compute the risk level for the given cloud-based resource.

In some embodiments, processor 48 can define, for a given group 110, score ranges 112 (i.e., thresholds) based on a target percentage for each risk level. For example, if risk levels 114 are critical, high, medium, low and insignificant, upon computing resource severity scores 108, processor can specify scores ranges 112 so that the distribution of the resource severity scores (i.e., for a given group 110) is 2% critical, 8% high, 15% medium, 30% low, and 45% insignificant.

Figure 6:
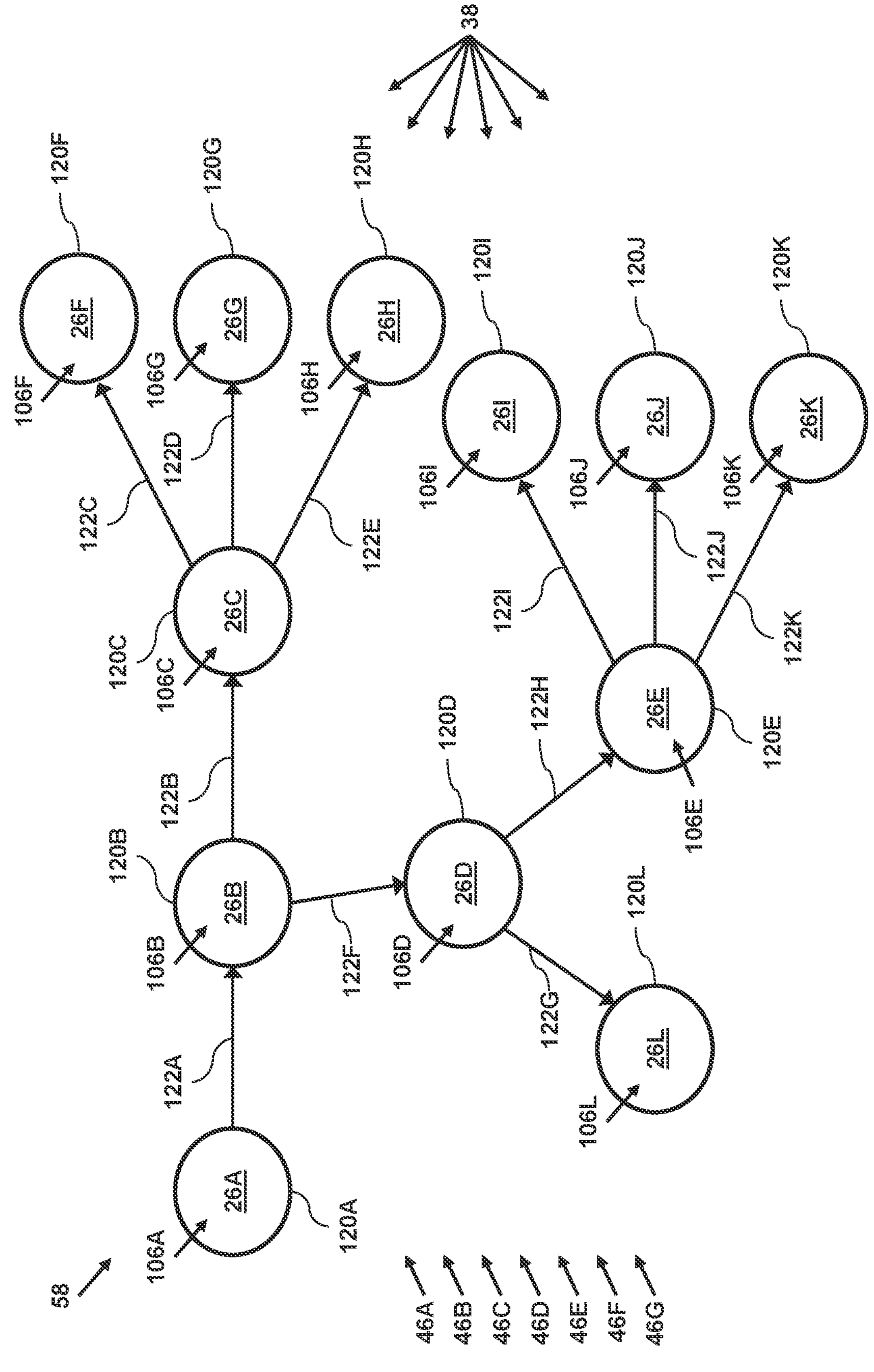
FIG. 6 is a directed graph whose nodes correspond to the graph records, in accordance with an embodiment of the present invention.

FIG. 6 shows an example of directed graph comprising nodes 120 connected by directed edges (or arcs) 122, In accordance with an embodiment of the present invention. In embodiments herein, nodes 120 correspond to graph node records 56, and therefore correspond to cloud-based resources 26.

In the example shown in FIG. 6, cloud-based resources 26, attack paths 46, impact scores 106, nodes 120 and edges 122 can be differentiated by appending a letter to the identifying numeral, so that the cloud-based resources comprise cloud-based resources 26A-26L, that attack paths comprise attack paths 46A-46G, the impact scores comprise impact scores 106A-106L, the nodes comprise nodes 120A-120L (i.e., corresponding to cloud-based resources 26A-26L), and the edges comprise edges 122A-122K.

In the example shown in FIG. 6, directed graph 58 comprises the following attack paths 46:

- Attack path 46A comprises nodes 120A→120B→120C→120F, corresponding to cloud-based resources 26A→26B→26C→26F.
- Attack path 46B comprises nodes 120A→120B→120C→120G, corresponding to cloud-based resources 26A→26B→26C→26G.
- Attack path 46C comprises nodes 120A→120B→120C→120F, corresponding to cloud-based resources 26A→26B→26C→26H.
- Attack path 46D comprises nodes 120A→120B→120D→120L, corresponding to cloud-based resources 26A→26B→26D→26L.
- Attack path 46E comprises nodes 120A→120B→120D→120E→120I, corresponding to cloud-based resources 26A→26B→26D→26E→26I.
- Attack path 46F comprises nodes 120A→120B→120D→120E→120J, corresponding to cloud-based resources 26A→26B→26D→26E→26J.
- Attack path 46G comprises nodes 120A→120B→120D→120E→120I, corresponding to cloud-based resources 26A→26B→26D→26E→26K.

In the example shown in FIG. 5, nodes 120F-120L are leaf nodes 120 in directed graph 58, and comprise cloud-based services 38 (i.e., storing data or hosting computing services) that a malicious actor can exploit in an attack on cloud computing system 22. For example, an attack using attack path 46D may comprise the following steps:

1. Cloud-based resource 26A comprises an S3™ BUCKET whose configuration exposes it to public access.
2. An access key is stored to cloud-based resource 26A.
3. The malicious actor uses the (now compromised) access key to access cloud-based resource 26B. In this example, cloud-based resource 26B comprises an EC2™ instance with limited permissions.
4. The malicious actor then uses cloud-based resource 26 with the compromised access key to access cloud-based resource 26D. In this example, cloud-based resource 26D comprises an EC2™ instance with high-level (e.g., administrator) permissions.
5. The malicious actor then exploits the permissions of cloud-based resource 26D so as create cloud-based resource 26L, which in this example can be a compute instance with sufficient processing power to perform cryptocurrency mining.

In the example shown in FIG. 6, processor 48 can compute impact scores 106 as follows:

- Impact score 106B=7, since seven attack paths (46A-46G) include cloud-based resource 26B.
- Impact score 106C=3, since three attack paths (46A-46C) include cloud-based resource 26C.
- Impact score 106D=4, since four attack paths (46D-46G) include cloud-based resource 26D.
- Impact score 106E=3, since three attack paths (46E-46G) include cloud-based resource 26E.
- Impact score 106F=1, since one attack path (46A) includes cloud-based resource 26F.
- Impact score 106G=1, since one attack path (46B) includes cloud-based resource 26G.
- Impact score 106H=1, since one attack path (46C) includes cloud-based resource 26H.
- Impact score 106L=1, since one attack path (46D) includes cloud-based resource 26L.
- Impact score 106I=1, since one attack path (46E) includes cloud-based resource 26I.
- Impact score 106J=1, since one attack path (46F) includes cloud-based resource 26J.
- Impact score 106K=1, since one attack path (46G) includes cloud-based resource 26K.

In some embodiments, impact score 106A can be ignored, since node 120A does not add any new attack paths 46.

In additional embodiments, processor 48 can prioritize resolution of security alerts 24 based on the respective impact scores 106 of the cloud-based resources to which the security alerts pertain. In the example shown in FIG. 6, impact score 106B for cloud-based resource 26B has the values of all the impact scores, and the security alerts for cloud-based resource 26B can be prioritized since resolving the security alerts for cloud-based resource 26B breaks all attack paths 46 (i.e., all attack paths 46 include cloud-based resource 26B in directed graph 58 shown in FIG. 6).

In embodiments herein, the impact scores for a given cloud-based resource 26 can indicate how many attack paths 46 can be "broken" by resolving the security alerts pertaining to the given cloud-based resource. Therefore, by prioritizing the security alerts for the node having the highest impact score 106, processor 48 can break the greatest number of attack paths 46.

Security Alert Prioritization

Figure 7:
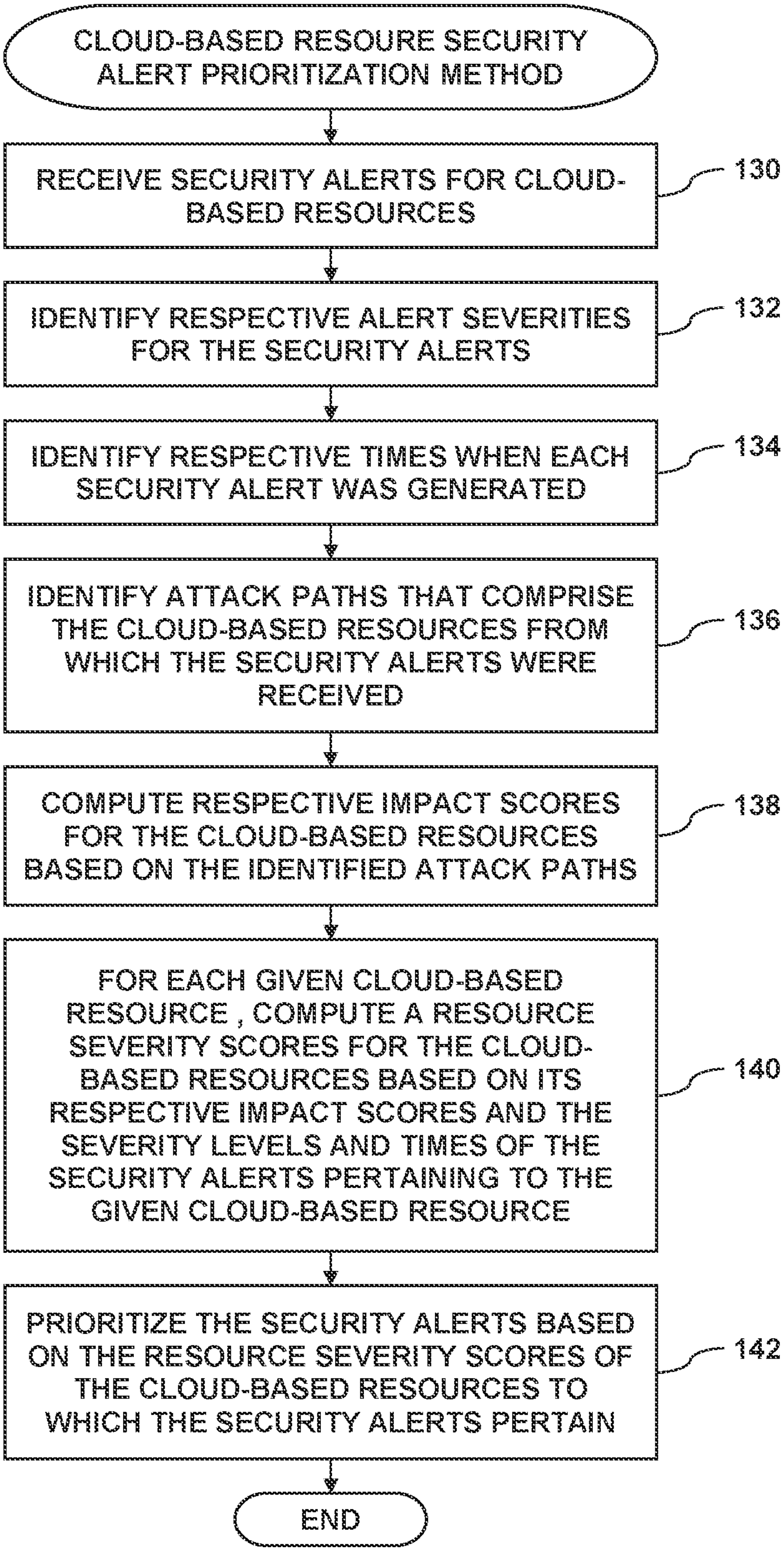
FIG. 7 is a flow diagram that schematically illustrates a method of prioritizing the security alerts for the cloud-based resources, in accordance with an embodiment of the present invention.

FIG. 7 is a flow diagram that schematically illustrates a method of prioritizing security alerts 24 for cloud-based resources 26, in accordance with an embodiment of the present invention.

In step 130, security server 20 receives security alerts 24 that pertain to cloud-based resources 26. As described supra, security server 20 can receive security alerts 24 by receiving alert records 42.

In steps 132 and 134, processor 48 identifies respective alert severities 78 and respective alert times 72 for the received security alerts. In some embodiments, processor 48 can extract alert severities 78 and alert times 72 from the received alert records. As described supra, alert severities 78 and alert times 72 can be used to compute respective resource severity scores 108 for cloud-based resources 26.

In step 136, processor 48 identifies attack paths 46. In embodiments herein, attack paths 46 comprise ordered sequences of cloud-based resources 26 that a malicious actor can access so as to gain unauthorized access to a given cloud service 38. As described supra, processor 48 can identify attack paths 46 by receiving the attack paths from cloud manager 28.

In step 138, processor 48 uses embodiments described hereinabove to compute respective impact scores 106 for the cloud-based resources in the received attack paths.

In step 140, processor 48 uses embodiments described hereinabove to compute respective resource severity scores 108 for the cloud-based resources in the received attack paths. As described supra, the resource severity score for a given cloud-based resource 26 is based on (a) the impact score for the cloud-based resources, (b) respective alert severities 78 for security alerts 24 that pertain to the given cloud-based resource, and (c) respective alert times 72 for security alerts 24 that pertain to the given cloud-based resource.

Finally in step 142, processor 48 prioritizes the security alerts based on the resource severity scores (i.e., that include impact scores 106, as described supra) of the cloud-based resources to which the security alerts pertain. As described supra, processor 48 can compute one or more risk levels 114 (e.g., low, medium, high, critical) for each given cloud-based resource 26, and prioritize security alerts 24 based on the risk levels of the cloud-based resources to which the security alerts pertain.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a cloud computing system, the method comprising:

receiving security alerts pertaining to cloud-based resources of the cloud computing system, wherein the security alerts have respective severity levels;

identifying a plurality of attack paths traversing the cloud-based resources, each attack path comprising an ordered sequence of a subset of the cloud-based resources that a malicious actor can traverse to gain unauthorized access to a service provided by the cloud computing system;

computing respective impact scores for the cloud-based resources based on respective counts of the identified attack paths traversing each of the cloud-based resources;

computing a resource severity score for each given cloud-based resource based on its respective impact score and the severity levels of the security alerts pertaining to the given cloud-based resource; and prioritizing the security alerts responsively to the respective impact scores of the cloud-based resources to which the security alerts pertain, wherein the prioritized security alerts enable identification of security violations for a given cloud-based resource that, when rectified, break multiple attack paths.

2. The method according to claim 1, wherein the severity levels range from low severity to high severity, and wherein computing the resource severity scores comprise applying exponential scaling factors to the severity levels so as to prioritize the security alerts having high severity.

3. The method according to claim 1, wherein the security alerts have respective times, and wherein computing the resource severity score for each given cloud-based resource is based on the respective times of the security alerts pertaining to the given cloud-based resource.

4. The method according to claim 3, wherein the respective times comprise first times, wherein the resource severity scores are computed at respective second times subsequent to the first times, and further comprising computing, for each given security alert pertaining to one of the cloud-based resources, a respective time decay factor based on a difference between its respective first time and the second time for the resource severity score for the one of the cloud-based resources, and computing the resource severity score for each given cloud-based resource based on the respective time decay factors of the security alerts pertaining to the given cloud-based resource.

5. The method according to claim 1, and further comprising grouping the cloud-based resources based on a grouping parameter, assigning risk levels to the cloud-based resources based on specified score ranges for the grouping parameter, and wherein prioritizing the security alerts responsively to the respective resource severity scores of the cloud-based resources to which the security alerts pertain comprises prioritizing the security alerts responsively to the respective assigned risk levels for the cloud-based resources to which the security alerts pertain.

6. The method according to claim 5, wherein a given grouping parameter comprises all the cloud-based resources.

7. The method according to claim 5, wherein the received security alerts were conveyed by one of more software applications executing in the cloud computing system, and wherein a given grouping parameter comprises a given software application.

8. The method according to claim 5, wherein the cloud-based resources have respective resource types, and wherein a given grouping parameter comprises a given resource type.

9. The method according to claim 5, wherein the cloud-based resources have respective resource groupings, and wherein a given grouping parameter comprises a given resource group.

10. The method according to claim 5, wherein the cloud-based resources have respective build types, and wherein a given grouping parameter comprises a given build type.

11. The method according to claim 1, wherein a given attack path comprises an ordered sequence of a subset of the cloud-based resources that exposes a service provided by the cloud computing system.

12. The method according to claim 1, wherein the cloud-based resources comprise respective configuration settings, and wherein a given security alert pertaining to a given cloud-based resource indicates the configuration settings for the given cloud-based resource do not comply with a specified configuration policy.

13. An apparatus for protecting a cloud computing system, comprising:
- a memory; and
- a processor configured:
  - to receive and store to the memory security alerts pertaining to cloud-based resources of the cloud computing system, wherein the security alerts have respective severity levels,
  - to identify a plurality of attack paths traversing the cloud-based resources, each attack path comprising an ordered sequence of a subset of the cloud-based resources that a malicious actor can traverse to gain unauthorized access to a service provided by the cloud computing system,
  - to compute respective impact scores for the cloud-based resources based on respective counts of the identified attack paths traversing each of the cloud-based resources,
  - to compute a resource severity score for each given cloud-based resource based on its respective impact score and the severity levels of the security alerts pertaining to the given cloud-based resource, and
  - to prioritize the security alerts responsively to the respective impact scores of the cloud-based resources to which the security alerts pertain, wherein the prioritized security alerts enable identification of security violations for a given cloud-based resource that, when rectified, break multiple attack paths.

14. A computer software product for protecting a cloud computing system, the computer software product comprising a non-transitory computer-readable medium, in which program instructions are stored, which instructions, when read by a computer, cause the computer:
- to receive security alerts pertaining to cloud-based resources of the cloud computing system, wherein the security alerts have respective severity levels;
- to identify a plurality of attack paths traversing the cloud-based resources, each attack path comprising an ordered sequence of a subset of the cloud-based resources that a malicious actor can traverse to gain unauthorized access to a service provided by the cloud computing system;
- to compute respective impact scores for the cloud-based resources based on respective counts of the identified attack paths traversing each of the cloud-based resources;
- to compute a resource severity score for each given cloud-based resource based on its respective impact score and the severity levels of the security alerts pertaining to the given cloud-based resource; and
- to prioritize the security alerts responsively to the respective impact scores of the cloud-based resources to which the security alerts pertain, wherein the prioritized security alerts enable identification of security violations for a given cloud-based resource that, when rectified, break multiple attack paths.

* * * * *